US00RE42281E

(19) United States
(12) Reissued Patent
Homme

(10) Patent Number: US RE42,281 E
(45) Date of Reissued Patent: Apr. 12, 2011

(54) SCINTILLATOR PANEL, RADIATION IMAGE SENSOR AND METHODS OF PRODUCING THEM

(75) Inventor: Takuya Homme, Hamamatsu (JP)

(73) Assignee: Hamamatsu Photonics K.K., Hamamatsu-shi, Shizuoka (JP)

(21) Appl. No.: 12/073,365

(22) PCT Filed: Sep. 11, 2001

(86) PCT No.: PCT/JP01/07885

§ 371 (c)(1),
(2), (4) Date: Mar. 10, 2003

(87) PCT Pub. No.: WO02/23220

PCT Pub. Date: Mar. 21, 2002

Related U.S. Patent Documents

Reissue of:
(64) Patent No.: 7,141,803
Issued: Nov. 28, 2006
Appl. No.: 10/363,906
Filed: Mar. 10, 2003

(30) Foreign Application Priority Data

Sep. 11, 2000 (JP) ..... P2000-275067
Sep. 11, 2000 (JP) ..... P2000-275075

(51) Int. Cl.
*G01N 21/64* (2006.01)

(52) U.S. Cl. ..... 250/483.1; 250/484.4; 250/370.1
(58) Field of Classification Search ..... 250/483.1, 250/484.4, 370.1
See application file for complete search history.

(56) References Cited

U.S. PATENT DOCUMENTS 4,032,791 A * 6/1977 Chiola et al. ..... 250/483.1
4,906,850 A 3/1990 Beerlage
5,132,539 A 7/1992 Kwasnick et al.
5,146,076 A 9/1992 Raverdy et al.
5,179,284 A 1/1993 Kingsley et al.
5,187,369 A 2/1993 Kingsley et al.
5,208,460 A 5/1993 Rougeot et al.
5,433,988 A * 7/1995 Fukuda et al. ..... 428/141
5,585,280 A 12/1996 Kwasnick et al.
5,864,146 A 1/1999 Karellas
6,031,234 A 2/2000 Albagli et al.
6,040,962 A 3/2000 Kanazawa et al.
6,278,118 B1 8/2001 Homme et al.
6,414,315 B1 7/2002 Wei et al.
6,429,430 B2 8/2002 Sato et al.
6,469,307 B2 10/2002 Takabayashi et al.
6,531,225 B1 3/2003 Homme et al.
6,573,506 B2 6/2003 Sato et al.

(Continued)

FOREIGN PATENT DOCUMENTS

JP 56-89702 7/1981
JP 59-500583 4/1984

(Continued)

*Primary Examiner*—David P Porta
*Assistant Examiner*—Kiho Kim
(74) *Attorney, Agent, or Firm*—Drinker Biddle & Reath LLP

(57) ABSTRACT

A scintillator panel 1 uses a glass substrate 5, having heat resistance, as a base member for forming a scintillator 10. Glass substrate 5 also functions as a radiation entry window. Also, a dielectric multilayer film mirror 6 is disposed as a light-reflecting film between the scintillator 10 and the glass substrate 5. Furthermore, a light-absorbing film 7 is disposed on the radiation entry surface of glass substrate 5 and this absorbs the light that has been emitted from scintillator 10 and has passed through the dielectric multilayer film mirror 6 and the glass substrate 5. Light components that are reflected by the radiation entry surface, etc., and return to the dielectric multilayer film mirror 7 and the scintillator 10 therefore do not occur and the optical output of the scintillator panel 1 is not subject to degrading effects.

15 Claims, 13 Drawing Sheets

U.S. PATENT DOCUMENTS

| | | | |
|---|---|---|---|
| 6,600,158 | B1 | 7/2003 | Okada et al. |
| 6,608,312 | B1 | 8/2003 | Okada et al. |
| 6,692,836 | B2 | 2/2004 | Reichert et al. |
| 6,753,531 | B2 | 6/2004 | Homme et al. |
| 6,762,420 | B2 | 7/2004 | Homme et al. |
| 6,777,690 | B2 | 8/2004 | Homme et al. |
| 6,835,936 | B2 | 12/2004 | Okada et al. |
| 6,849,336 | B2 | 2/2005 | Homme et al. |
| 7,034,306 | B2 | 4/2006 | Homme et al. |
| 7,087,908 | B2 | 8/2006 | Homme |
| 2002/0017613 | A1 | 2/2002 | Homme et al. |
| 2002/0076568 | A1 | 6/2002 | Reichert et al. |
| 2002/0079493 | A1 | 6/2002 | Morishita |
| 2004/0000644 | A1 | 1/2004 | Homme |
| 2006/0263521 | A1 | 11/2006 | Sato et al. |

FOREIGN PATENT DOCUMENTS

| | | |
|---|---|---|
| JP | 61-73901 | 4/1986 |
| JP | 61-246700 | 11/1986 |
| JP | 02-058000 | 2/1990 |
| JP | 04-501482 | 3/1992 |
| JP | 4-118599 | 4/1992 |
| JP | 05-196742 | 8/1993 |
| JP | 05-203755 | 8/1993 |
| JP | 05-249299 | 9/1993 |
| JP | 07-287100 | 10/1995 |
| JP | 9-297181 | 11/1997 |
| JP | 10-160898 | 6/1998 |
| JP | 11-101895 | 4/1999 |
| JP | 11-160442 | 6/1999 |
| JP | 2000-162396 | 6/2000 |
| JP | 3130633 | 11/2000 |
| JP | 2006-113007 | 4/2006 |
| JP | 2006-119124 | 5/2006 |
| WO | WO99/66345 | 12/1999 |
| WO | WO99/66348 | 12/1999 |
| WO | WO00/63722 | 10/2000 |
| WO | 02/23220 | 3/2002 |
| WO | 02/232219 | 3/2002 |

* cited by examiner

SCINTILLATOR PANEL, RADIATION IMAGE SENSOR AND METHODS OF PRODUCING THEM

Matter enclosed in heavy brackets [ ] appears in the original patent but forms no part of this reissue specification; matter printed in italics indicates the additions made by reissue.

TECHNICAL FIELD

This invention relates to a scintillator panel to be used for radiation imaging for medical use, etc., a radiation image sensor that combines this scintillator panel with an image pickup device, and methods of manufacturing these items.

BACKGROUND ART

Radiation image sensors, which convert radiation into electrical signals and enable electrical processing of the signals, are used widely in medical and industrial fields. The acquired electrical signals can be processed electrically and displayed on a monitor. A representative example of such a radiation image sensor is a radiation image sensor that uses a scintillator material for converting radiation in to light. With this type of radiation image sensor, an image pickup device, for further conversion of the converted light into electrical signals, is used in combination. For example, a MOS type image sensor, etc., is used as the image pickup device. For use in medical fields and non-destructive inspections (especially inspections using a micro-focused X-ray source, etc.), the irradiation dose of radiation is limited, and thus a radiation image sensor of high sensitivity that enables a high optical output with the limited irradiation dose is desired.

FIG. 16 is a longitudinal sectional view of a radiation image sensor described in International Patent Publication No. WO99/66,345 (referred to hereinafter as "Prior Art 1"). To form this radiation image sensor 4, a scintillator panel 91, comprising a substrate 95, a light reflecting film 96, formed on the substrate 95, and a scintillator 10, formed on the light reflecting film 96, is combined with an image pickup device 20, which is disposed so as to face the scintillator 10. Radiation 30 enters from the substrate 95 side, passes through the light reflecting film 96, and is converted into light at the scintillator 10. The light resulting from conversion is received by the image pickup device 20 and converted into electrical signals. The light reflecting film 96 has a function of reflecting the light emitted by the scintillator 10 and returning this light to the scintillator 10 side to thereby increase the amount of light entering the light receiving part of the image pickup device 20. A film of metal, such as aluminum, etc., is mainly used as the light reflecting film 96.

FIG. 17 is a longitudinal sectional view of a radiation imaging device described in JP05-196742A (referred to hereinafter as "Prior Art 2"). This radiation imaging device 93 comprises a substrate 94, a light detector 98, which is disposed on the substrate 94 and serves as an image pickup device, a scintillator 10, formed on the light detector 98, a thin film 97, disposed on the scintillator 10, a light reflecting film 90, formed on the thin film 97, and a moisture sealing layer 99, formed on the light reflecting film 90. This arrangement differs largely from that of the Prior Art 1 in that the light detector 98 is used as a base member for fixing and supporting the scintillator 10 and the light reflecting film 90 is formed above the scintillator 10 across the thin film 97. The thin film 97 is formed of an organic or inorganic material and absorbs the non-uniformity on the scintillator 10 to make the light reflecting film 90 uniform in reflectance. This publication indicates that a dielectric multilayer film, arranged from $TiO_2$ and $SiO_2$, etc., which differ mutually in optical refractive index, may be used as the light reflecting film 90.

DISCLOSURE OF THE INVENTION

These prior-art radiation image sensors had the following problems. That is, with the Prior Art 1, though a metal film is used as the light reflecting film 96, in many cases, this metal film 60 reacts with the scintillator 10 and undergoes corrosion. Such corrosion becomes significant especially in a case where CsI (Tl) is used as the scintillator 10.

With the Prior Art 2, a dielectric multilayer film is used as light reflecting film 90, and since the scintillator 10 has a structure wherein a plurality of microscopic, columnar crystals, each with a diameter of approximately several μm to several dozen μm, are arranged in the form of bristles and thus has minute unevenness on the surface, it is difficult to directly form the dielectric multilayer 70 on such an uneven surface. The thin film 97 is thus interposed to flatten this unevenness. In order to form the dielectric multilayer film 90 to a state in which it is provided with a high reflectance, vapor deposition must be performed upon heating the base on which the multilayer film is to be formed to approximately 300° C. However, it is difficult to even simply apply a high temperature in a case where the thin film 97 is an organic film. Though it is possible to form a multilayer film at a temperature of no more than 300° C., it is difficult to control the thickness of the film that is formed and the problem that the dielectric multilayer film 90 becomes formed in a colored state occurs, causing the reflectance to drop and the optical output to decrease. In a case where the thin film 97 is formed of an inorganic film, it is difficult to form a flat surface for forming the multilayer film on the scintillator with an inorganic film, and as a result, the dielectric multilayer film becomes uneven on the surface (reflecting surface) and cannot be provided with high reflectance.

Thus it is an object of this invention to provide a scintillator panel and a radiation image sensor, which is excellent in corrosion resistance and yet can provide a high optical output, and methods of manufacturing such a scintillator panel and radiation image sensor.

In order to achieve the above object, a scintillator panel according to the present invention is characterized in comprising a heat-resistant, light-transmitting substrate, a dielectric multilayer film mirror, deposited on the substrate, a scintillator, deposited so as to arrange a plurality of columnar structures on the dielectric multilayer film mirror and converting incident radiation into light and then emitting this light, a protective film, covering at least the scintillator, and a light entry/reflection restraining film, disposed on the interface of the substrate with the dielectric multilayer film mirror and/or the surface of the substrate at the side opposite the dielectric multilayer film mirror side and restrains the entry of light from the dielectric multilayer film mirror to the substrate or the reflection of light, which has entered the substrate from the dielectric multilayer film mirror, at the surface opposite the substrate surface on which the dielectric multilayer film mirror is formed.

With such a scintillator panel, since the dielectric multilayer film mirror can be formed on the heat-resistance substrate at a high temperature, the dielectric multilayer film mirror can be formed to have good reflection characteristics and the optical output can thus be improved. The dielectric multilayer film mirror does not react with the scintillator and is thus excellent in corrosion resistance. Furthermore, though due to its characteristics, the dielectric multilayer film mirror transmits light slightly, according to the present invention, a light entry/reflection film is disposed on either surface of the light-transmitting substrate to enable the generation of stray light, which passes through the dielectric multilayer film mirror, scatters inside the substrate, and re-enters into the scintillator from positions that differ from the initial entry positions, to be restrained and thereby enable degradation of the resolution and S/N ratio of the scintillator panel to be restrained.

By making the substrate a glass substrate, a substrate that is thin and hard to bend is realized and a scintillator panel with good characteristics is obtained.

The light entry/reflection restraining film is preferably (1) a light-absorbing film, which is positioned on the surface of the substrate at the side opposite the substrate surface on which the dielectric multilayer film mirror is formed and absorbs light that has passed through the substrate; or (2) a light-absorbing film, which is formed at the interface of the substrate with the dielectric multilayer film mirror and absorbs light that has passed through the dielectric multilayer film mirror; or (3) a light-reflecting film, which is formed at the interface of the substrate with the dielectric multilayer film mirror and reflects light that has passed through the dielectric multilayer film mirror back to the dielectric multilayer film mirror side. Black aluminum and a polyimide film that contains carbon particles can be given as examples of such a light-absorbing film, and an aluminum film or other metal film can be given as an example of such a light-reflecting film.

Furthermore, it is preferable to be provided with the separation preventing layer between the scintillator and the dielectric multilayer film for improving adhesion with the scintillator.

The scintillator preferably has CsI or NaI as the main component since the conversion efficiency is sufficient. The scintillator may also be of a photostimulable phosphor. In this case, a radiation image can be stored temporarily.

Meanwhile, the radiation image sensor according to the present invention comprises: any of the above-described scintillator panels; and an image pickup device, disposed so as to face the scintillator and converting the light emitted by the scintillator into electrical signals.

A radiation image sensor provided with a scintillator panel having the above-described characteristics is thus realized, and the light emitted by this scintillator panel can be processed electrically and displayed on a monitor, etc.

Also, a radiation image sensor may comprise: the scintillator panel according to the present invention, provided with a light-absorbing film at a surface at the side opposite the scintillator; an image pickup device, disposed so as to face the scintillator of the scintillator panel and converting the light emitted by the scintillator into electrical signals; and a housing, covering the image pickup device and the scintillator panel and being fixed in press-contact with the light-absorbing film.

With such a radiation image sensor, the radiation image sensor is protected by the housing. Also by forming the housing of a light-blocking material, the entry of extraneous light into the radiation image sensor can be restrained effectively. Furthermore, since the housing is disposed in a condition where it is put in press-contact with the light-absorbing film, the scintillator is adhered closely to the image pickup device. Leakage of light, cross-talk, etc., are thus prevented from occurring in the process of recognition by the image pickup device of the light emitted by the scintillator.

Here, the preferable light-absorbing film is an elastic body as adhesion of the scintillator with the image pickup device will then be secured.

Meanwhile, a scintillator panel manufacturing method according to the present invention is characterized by comprising the steps of preparing a heat-resistant, light-transmitting substrate, forming a dielectric multilayer film mirror with desired reflection characteristics by laminating multiple dielectric layers of predetermined thickness onto the substrate, depositing a plurality of columnar structures of a scintillator, which converts radiation into light, on the dielectric multilayer film mirror, forming a light-reflection preventing film on the surface of the substrate at the side opposite the surface on which the scintillator is formed, and covering at least the scintillator with a protective film.

Or, it is characterized by comprising the steps of: preparing a heat-resistant, light-transmitting substrate; forming a light-transmission restraining film, which restrains the transmission of light, on the substrate, forming a dielectric multilayer film mirror with desired reflection characteristics by laminating multiple dielectric layers of predetermined thickness onto the light-transmission restraining film, depositing a plurality of columnar structures of a scintillator, which converts radiation into light, on the dielectric multilayer film mirror, and covering at least the scintillator with a protective film.

By these manufacturing methods, the scintillator panels according to the present invention, described above can be manufactured efficiently.

Furthermore, the radiation image sensor according to the present invention can be manufactured by disposing an image pickup device so as to face the scintillator of the scintillator panel thus obtained. A step of covering the scintillator panel with a housing may also be provided.

Or, the radiation image sensor manufacturing method according to the present invention may comprise the steps of preparing a heat-resistant, light-transmitting substrate, forming a dielectric multilayer film mirror with desired reflection characteristics by laminating multiple dielectric layers of predetermined thickness onto the substrate, depositing a plurality of columnar structures of a scintillator, which converts radiation into light, on the dielectric multilayer film mirror, preparing a scintillator panel by covering at least the scintillator with a protective film, and disposing an image pickup device so as to face the scintillator of the scintillator panel, disposing a light-reflection preventing member, formed of an elastic body, on the surface of the scintillator panel at the side opposite the surface on which the scintillator is formed, and housing the image pickup device and the light-reflection preventing member inside a housing.

BEST MODES FOR CARRYING OUT THE INVENTION

Figure 1:
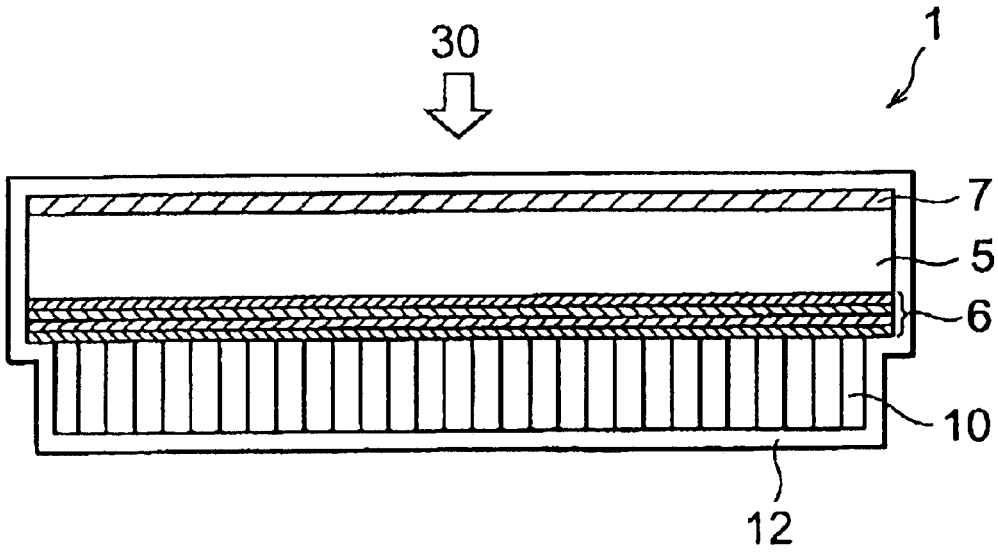
FIG. 1 is a longitudinal sectional view of a first embodiment of a scintillator panel according to the present invention.

Preferred embodiments of this invention shall now be described in detail with reference to the attached drawings. To facilitate the comprehension of the explanation, the same reference numerals denote the same parts, where possible, throughout the drawings, and a repeated explanation will be omitted.

FIG. 1 is a longitudinal sectional view of a first embodiment of a scintillator panel according to the present invention. The scintillator panel 1 comprises a Pyrex glass substrate 5, into which radiation 30 enters, a dielectric multilayer film mirror 6, formed on (the surface opposite the radiation entry surface of) the Pyrex glass substrate 5, and a scintillator 10, which is formed on the dielectric multilayer film mirror 6 and emits light by conversion of the radiation 30 that has entered the Pyrex glass substrate 5 and has passed through the dielectric multilayer film mirror 6. The scintillator 10 has a structure in which a plurality of microscopic columnar crystals, each with a diameter of a few μm to a few dozen μm, are arranged in the form of bristles. TI-doped CsI is used for example for the scintillator 10. Besides this NaI or other phosphor, which emits visible light, ultraviolet light, infrared light, etc., from various forms of radiation, may be used in the scintillator. A black aluminum 7 is disposed as a light-absorbing film on the radiation entry surface of the Pyrex glass substrate 5 and this absorbs light that has been emitted by the scintillator 10 and has been transmitted through the dielectric multilayer film mirror 6 and the Pyrex glass substrate 5. This point shall be described in detail later. The entirety of these is covered by a polyparaxylylene film 12, which serves as a protective film, and the scintillator panel 1 is thus formed. A thin film of SiN, etc., may be provided between the Pyrex glass substrate 5 and the dielectric multilayer film mirror 6. This thin layer serves to make the glass substrate surface a uniform, clean surface.

With this scintillator panel 1, since Pyrex glass is used as the substrate on which scintillator 10 is vapor deposited and formed as columnar crystals, the substrate is formed thinly and prevented from bending. Since the substrate is thus formed thinly, the sensitivity to radiation is increased correspondingly. Also, since the substrate does not be bent, handling during manufacture, such as when an image pickup device 20 is mounted to the scintillator panel 1, is facilitated.

The dielectric multilayer film mirror 6 is a multilayer film, wherein $TiO_2$ and $SiO_2$, which differ mutually in optical refractive index, are alternately laminated repeatedly a plurality of times, and this film mirror acts as a light-reflecting film that reflects the light emitted by the scintillator 10 and amplifies the optical output. Since this dielectric multilayer film mirror 6 is formed on the Pyrex glass substrate 5, which is heat resistant, vapor deposition at a high temperature close to 300° C. is enabled and this enables the multilayer film mirror to be formed to a state in which it is provided with high reflectance. Also, the dielectric multilayer film is excellent in corrosion resistance and thus will not corrode upon reacting with the scintillator 10 as in the case of a metal film. A polyimide layer may be provided between the dielectric multilayer film mirror 6 and the scintillator 10 as a separation preventing layer that prevents the separation of the scintillator 10 from the dielectric multilayer film 6.

Figure 2A:
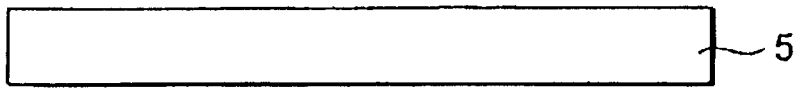
FIG. 2A to FIG. 2F are longitudinal sectional views, illustrating the method for manufacturing the scintillator panel of FIG. 1.
Figure 2B:
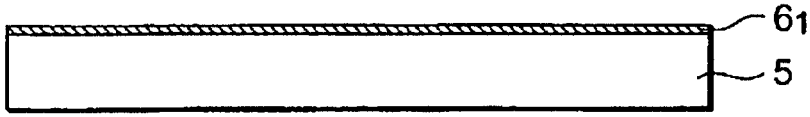
Figure 2C:
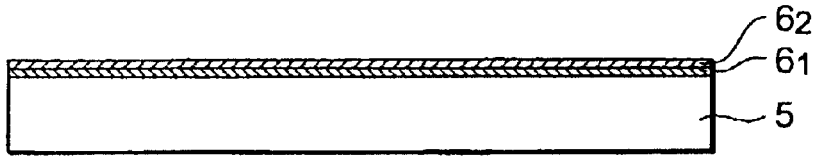
Figure 2D:
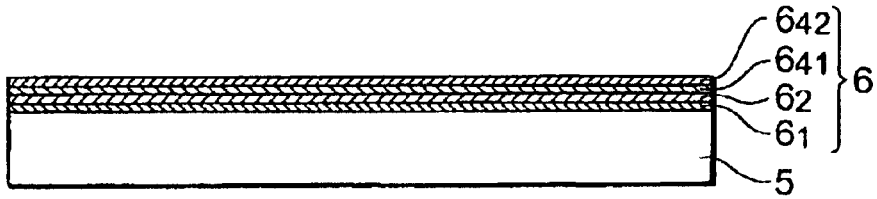
Figure 2E:
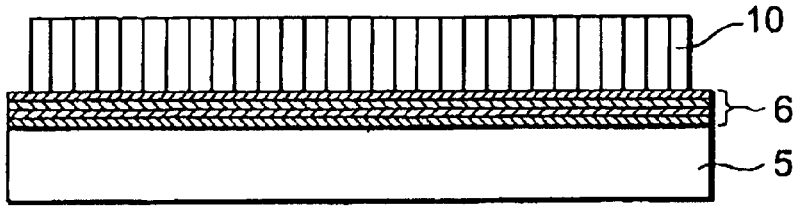
Figure 2F:
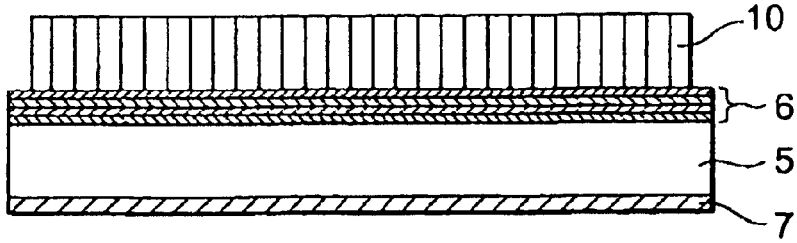

The processes for manufacturing this scintillator panel 1 shall now be described. First, a Pyrex glass substrate 5 of 20 cm square and 0.5 mm thickness is prepared (see FIG. 2A), and $TiO_2$ $\mathbf{6}_1, \mathbf{6}_3, \ldots \mathbf{6}_{41}$ and $SiO_2$ $\mathbf{6}_2, \mathbf{6}_4, \ldots \mathbf{6}_{42}$ are laminated alternately and repeatedly onto this Pyrex substrate 5 by vacuum vapor deposition (see FIG. 2B and FIG. 2C) to form a dielectric multilayer film mirror 6 comprising a total of 42 layers (total thickness: approximately 4 μm) (see FIG. 2D). Thereafter, a CsI film of a thickness of 300 μm is formed as a scintillator 10 by vapor deposition on the dielectric multilayer film mirror 6 (see FIG. 2E). Then in order to flatten foreign matter and anomalous growth parts on the CsI surface, a glass plate is placed on the CsI surface and pressure is applied at a force of 1 atmosphere. Then as a light-absorbing film, a black aluminum 7 is vapor deposited in argon gas onto the radiation entry surface of Pyrex glass substrate 5 (see FIG. 2F). Lastly, a polyparaxylylene film 12 of 10 μm thickness is formed by CVD as a protective film that covers the entirety, and the scintillator panel 1 shown in FIG. 1 is thus formed.

Figure 3:
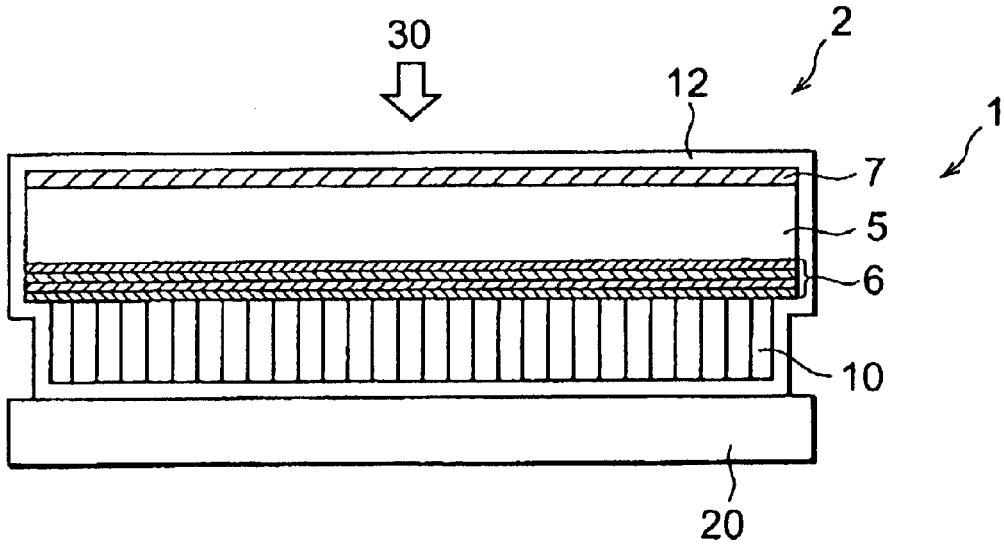
FIG. 3 is a longitudinal sectional view of a radiation image sensor that uses the scintillator panel of FIG. 1.

FIG. 3 is a longitudinal sectional view of a first embodiment of a radiation image sensor according to the present invention. This radiation image sensor 2 is arranged by combining an image pickup device 20 with the scintillator panel 1 shown in FIG. 1 by positioning the image pickup device 20 so as to face the scintillator 10. The image pickup device 20 converts the light emitted by the scintillator 10 into electrical signals. For example, a MOS type image sensor having two-dimensionally aligned Si photodiodes is used as the image pickup device 20.

Figure 4:
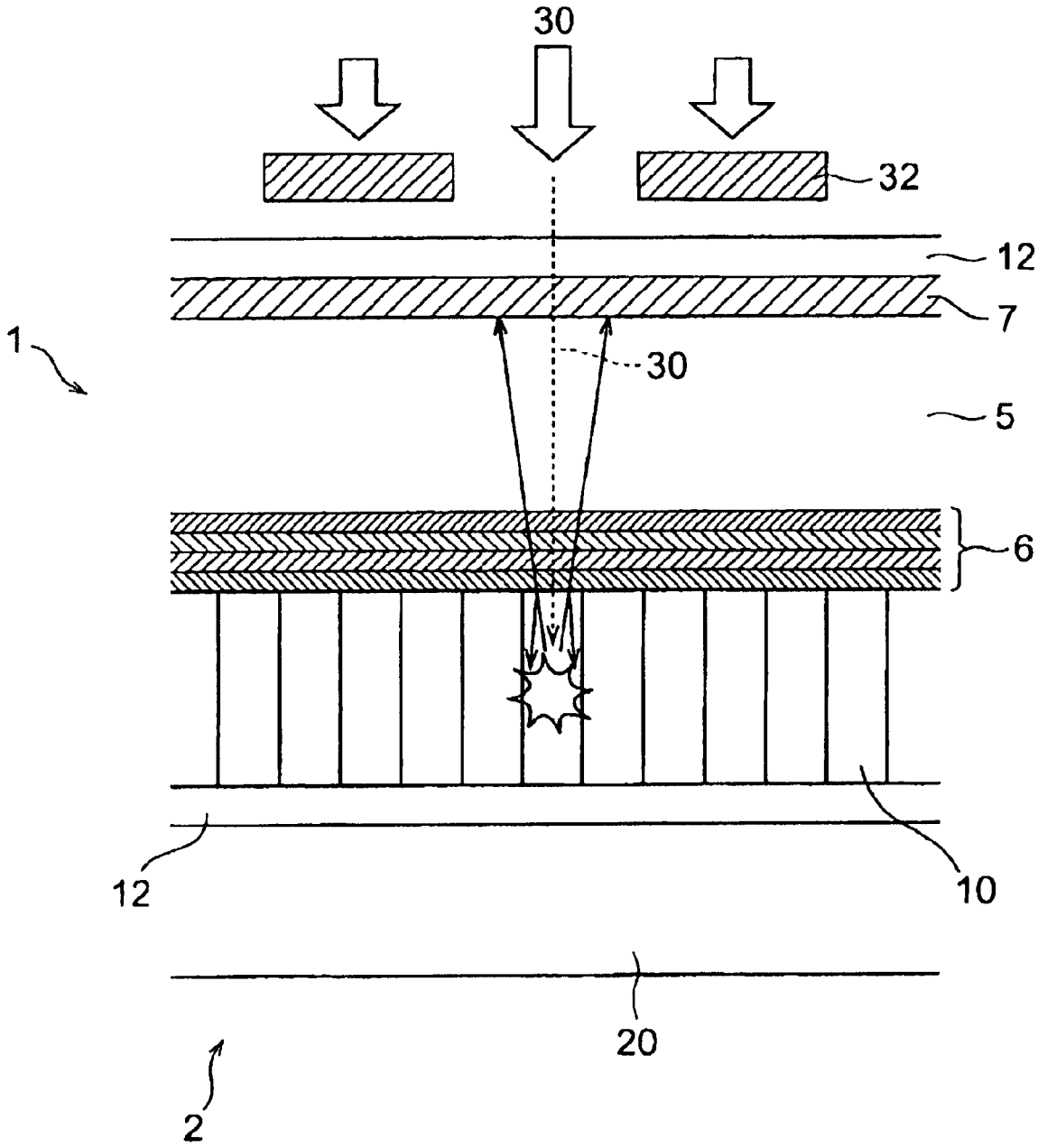
FIG. 4 is an enlarged sectional view, illustrating the operation of this radiation image sensor.

FIG. 4 is an enlarged sectional view for explaining the operation of the radiation image sensor 2. Radiation 30, which has not been blocked by or has been transmitted through a subject 32, passes through the polyparaxylylene film 12, black aluminum 7, Pyrex glass substrate 5, and dielectric multilayer film mirror 6 and enters the scintillator 10. The scintillator 10 converts the incident radiation 30 into light and emits this light. Of the light emitted from the scintillator 10, the components that do not proceed toward the image pickup device side but proceed toward the dielectric multilayer film mirror 6 side are reflected by the dielectric multilayer film mirror 6, are thereby returned to the scintillator 10, and in the final stage, proceed toward and are received by the image pickup device 20. The image pickup device 20 converts the received light image information into electrical signals and outputs these signals. The electrical signals that are thus output are sent to and displayed on a monitor, etc., as image signals. As mentioned above, with the present embodiment, since the dielectric multilayer film mirror 6 has a high reflectance, the scintillator panel 1 and the radiation image sensor 2 that use this dielectric multilayer film mirror 6 are high in optical output.

However, since the optical reflectance of the dielectric multilayer film mirror 6 is not 100%, of the light components of the light emitted by the scintillator 10 that proceed toward the dielectric multilayer film mirror 6 side, several % are transmitted through the dielectric multilayer film mirror 6. Since the Pyrex glass substrate 5 also has a light transmitting property, the light that has been transmitted through the dielectric multilayer film mirror 6 passes through the Pyrex glass substrate 5. With the scintillator panel 1 of the present embodiment, since the black aluminum 7 is formed as a light-absorbing film on the radiation entry surface (the surface at the side opposite the dielectric multilayer film mirror 6 side) of the Pyrex glass substrate 5, the transmitted light is absorbed by this black aluminum 7 and will not be reflected by the radiation entry surface and return to the dielectric multilayer film mirror 6 side. That is, the light, which has entered into the Pyrex glass substrate 5, will not be reflected by the radiation entry surface of the Pyrex glass substrate 5 and thereafter enter the image pickup device 20 and nor will the light, which has entered the Pyrex glass substrate 5, pass through the Pyrex glass substrate 5, be repeatedly reflected inside the housing 25, and enter the image pickup device 20 in the final stage in a condition that is spread in comparison to the light that enters the image pickup device 20 directly from the scintillator 10. As a result, a scintillator panel 1, with which there are no degrading effects on the optical output due to the lowering of the contrast of the obtained radiation image and generation of false signals, is realized.

As mentioned above, the use of glass as the substrate of the scintillator panel 1 provides the advantage of enabling the forming of a scintillator panel that is thin and yet will not bend. The use of a dielectric multilayer film as a light-reflecting film provides the advantage of enabling the forming of a light-reflecting film with excellent corrosion resistance and high reflectance. Though when a scintillator panel that incorporates both of these is formed, transmitted light, which causes lowering of contrast, will occur, with the present embodiment, this transmitted light is absorbed by the provision of the light-absorbing film (the black aluminum 7 in the present embodiment), thereby enabling the advantages of the two abovementioned components to be put to use while resolving the problem that occurs when the two components are used.

In order to restrain the stray light that causes degradation of resolution, a reflection preventing film that restrains reflection at the exit surface may be disposed in place of the light-absorbing film 7. This reflection prevention film preferably functions as a reflection film or as an absorbing film for light that tends to enter from the exterior into the reflection prevention film.

In order to evaluate the contrast ratio of the radiation image sensor 2 according to the present invention, two samples (referred to as "Examples 1 and 2") of this invention's embodiment and a sample (referred to as "Comparative Example 1") of a prior-art type radiation image sensor were prepared as mutually different arrangements. With all samples, a light-reflecting film that is a dielectric multilayer film is formed on a Pyrex glass substrate, a scintillator formed of CsI is deposited, a polyparaxylylene film is used as a protective film, and a C-MOS is used as the image pickup device. The differences are that whereas the Comparative Example 1 is not provided with a light-absorbing film, the Example 1 is provided with a black aluminum light-absorbing film and the Example 2 is provided with a dark-colored moltopren light-absorbing film.

As a test for measuring the contrast ratio, radiation was irradiated upon placing a lead object of 3 cm diameter and 0.5 mm thickness on the Pyrex glass substrate 5, the signal values acquired by the radiation image sensor 2 for a portion covered by the lead and for a portion exposed to radiation, respectively, were measured, and the ratio of these values was computed. As a result, when the contrast ratio of the Comparative Example 1 is set to 100, the contrast ratios of both of the Examples 1 and 2 were 110, thus confirming that images that are clearer than that obtained by the Comparative Example 1 are acquired by the Examples.

Figure 5:
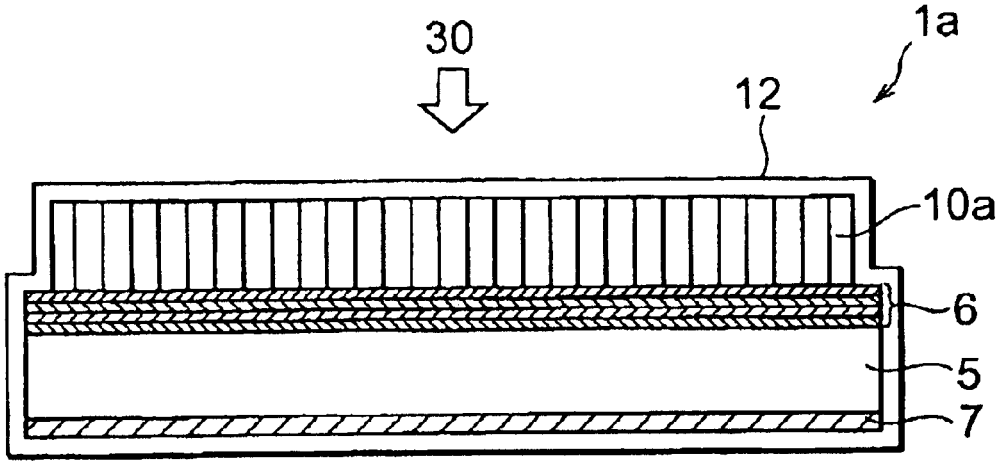
FIG. 5 is a longitudinal sectional view of a second embodiment of a scintillator panel according to the present invention.

FIG. 5 is a longitudinal sectional view, showing a second embodiment of a scintillator panel according to the present invention. This scintillator panel 1a has nearly the same arrangement as the scintillator panel 1 of the first embodiment shown in FIG. 1. The differences are that a dielectric multi layer film mirror 6a, formed by laminating $Ta_2O_5$/$SiO_2$, which has a high reflectance for light from the visible light to the ultraviolet range, is used and a so-called photostimulable phosphor of CsBr:Eu, etc., is used as scintillator 10a.

Figure 6:
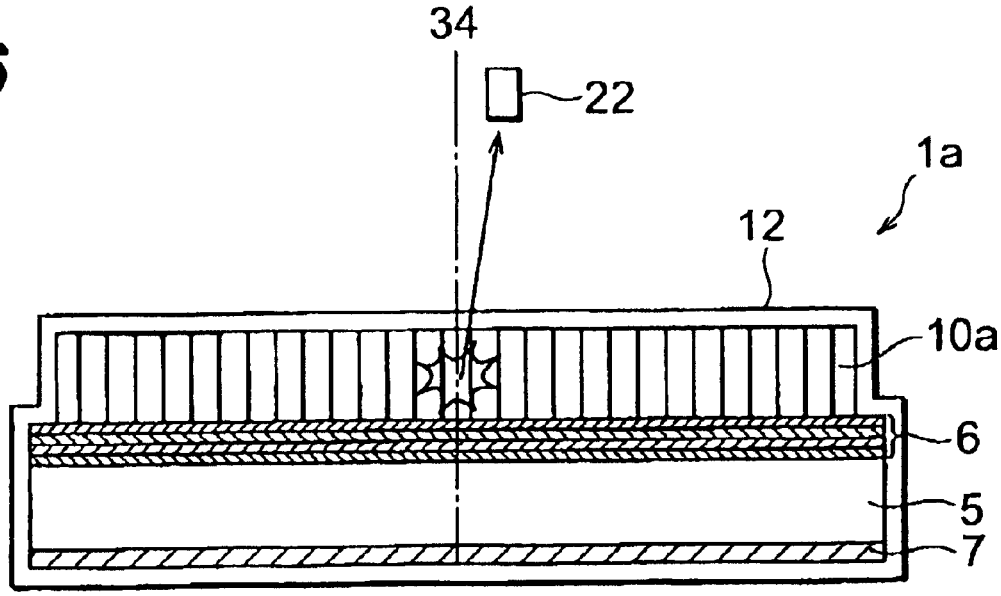
FIG. 6 is a diagram for explaining the method of use of this scintillator panel.

Unlike the scintillator panel 1 shown in FIG. 1, this scintillator panel 1a is used by irradiating radiation 30 from the scintillator 10a side. The scintillator 10a is excited by the radiation that enters in such a manner. Thereafter, by scanned illumination of a He—Ne laser beam 34 across the scintillator 10a as shown in FIG. 6, light that is in accordance with the amount of the irradiated radiation 30 is emitted from the scintillator 10a. This emitted light is detected by light detector 22 and converted into electrical signals to enable the acquisition of image signals corresponding to the radiation image.

By thus using a photostimulable phosphor for scintillator 6a, storing the radiation image temporarily, and reading out the image by laser beam scanning, the need to prepare an image pickup device of large area is eliminated and the acquisition of a large-area radiation image, such as an image obtained for chest imaging, etc., is facilitated.

Besides the abovementioned CsBr:Eu, various phosphors, such as those disclosed in JP No. 3,130,633, may be used as the photostimulable phosphor. Also, the $TiO_2$/$SiO_2$ laminate used in the first embodiment or an $HFO_2$/$SiO_2$ laminate, etc., maybe used for the dielectric multilayer film mirror.

Figure 7:
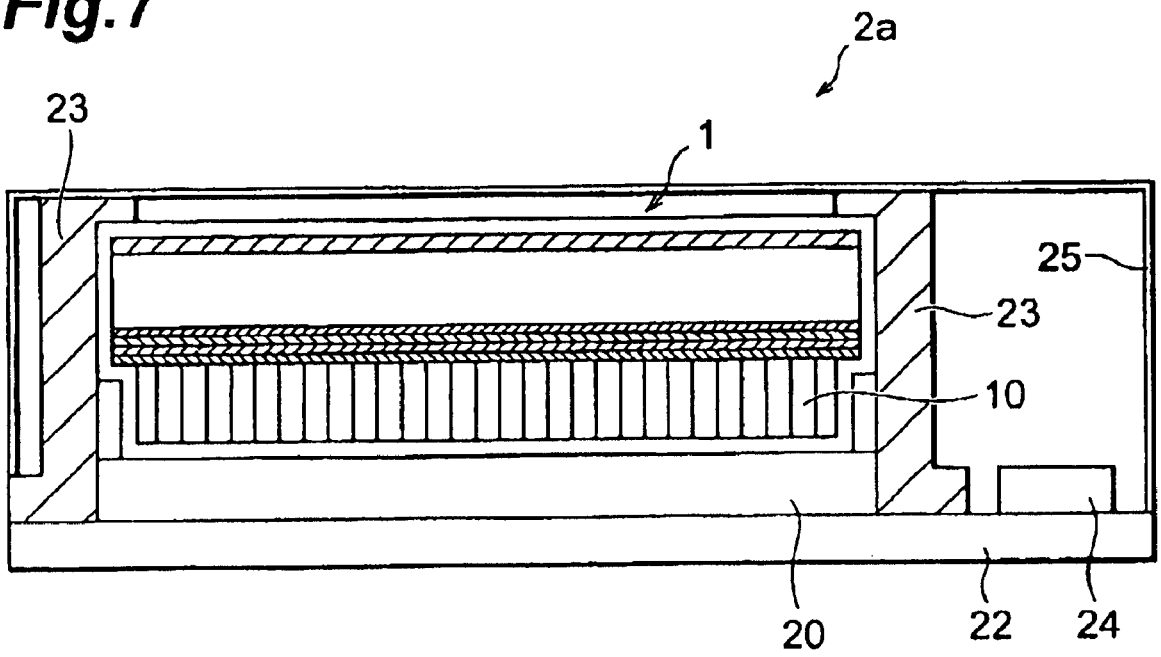
FIG. 7 and FIG. 8 are longitudinal sectional views, illustrating second and third embodiments, respectively, of a radiation image sensor according to the present invention.

FIG. 7 is a longitudinal sectional view, showing a second embodiment of a radiation image sensor according to the present invention. With this radiation image sensor 2a, the radiation image sensor 2, shown in FIG. 3, is set on a sensor substrate 22 along with a control device 24, having driving and reading circuits, and is housed inside a housing 25. The sensor 2 is fixed to the sensor substrate 22 by means of a pair of fixing jigs 23.

The housing 25 has a radiation transmitting property and protects and shields sensor 2 from light. Also, since the scintillator panel 1 is adhered closely to the image pickup device 20 by the cooperative action of the fixing jigs 23 and the housing 25, the occurrence of leakage of light, cross-talk, etc., in the process of recognizing the light emitted by the scintillator 10 by the image pickup device 20 can be prevented. The housing 25 may be arranged to cover just the radiation image sensor 2 and not contain the sensor substrate 22.

Though JP 11-160442A discloses an X-ray image detector, with which a phosphor is fixed to the light receiving surface of a CCD element by the pressing force of an elastic body, this elastic body is limited in action to pressing the phosphor against the CCD element and does not have a light-absorbing property as in the present invention.

Figure 8:
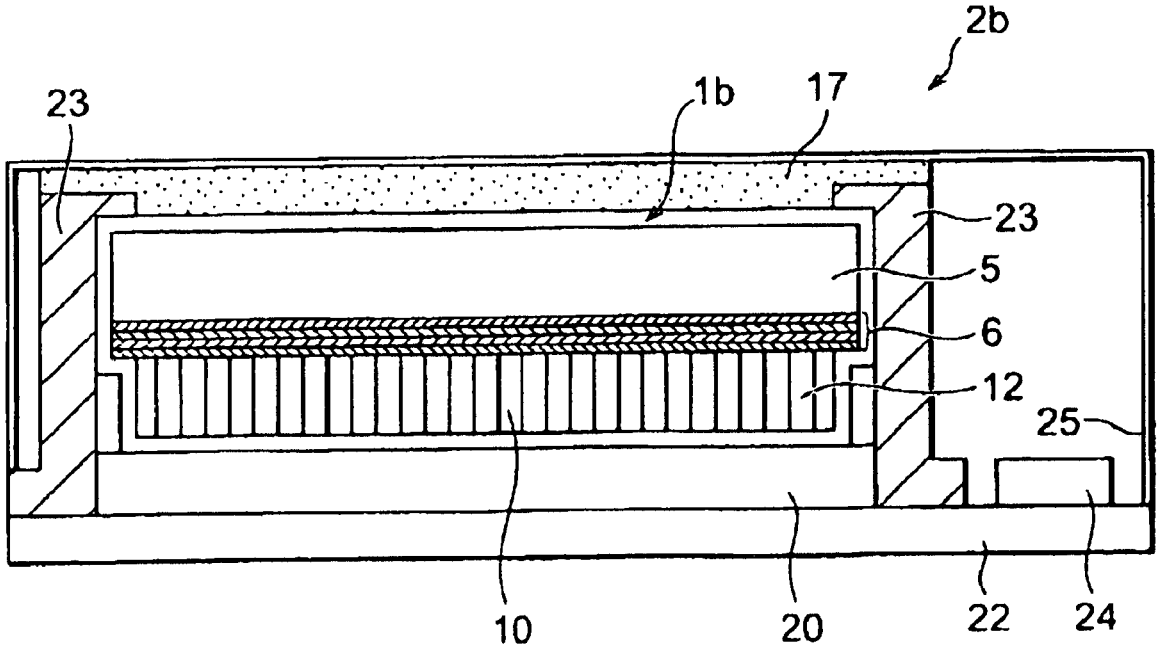

FIG. 8 is a longitudinal sectional view of a third embodiment of a radiation image sensor according to the present invention. A scintillator panel 1b of this radiation image sensor 2b differs from this invention's scintillator panel 1 in that a light-absorbing film 7 is not provided on the scintillator panel 1b itself. Instead, a dark-colored moltopren member 17, which is an elastic body, is disposed between the radiation entry surface of the scintillator panel 1b's Pyrex substrate 5, which is coated with a polyparaxylylene film 12, and a housing 25. A black-colored sponge may be used in place of the moltopren member 17. The housing 25 is disposed in a state where it is put in press contact against the moltopren member 17.

Since the moltopren member 17 is an elastic body, the scintillator panel 1 is pressed against an image pickup device 20 by the action of the housing 25. Since the scintillator panel 1 is thus adhered closely to the image pickup device 20, the occurrence of leakage of light, cross-talk, etc., is prevented further in the process of recognition by the image pickup device 20 of the light emitted by the scintillator 10. Since the light-absorbing member 17, which is an elastic body, contacts and presses against the glass substrate 5, it also provides the effect that force tends to be applied uniformly.

Figure 9:
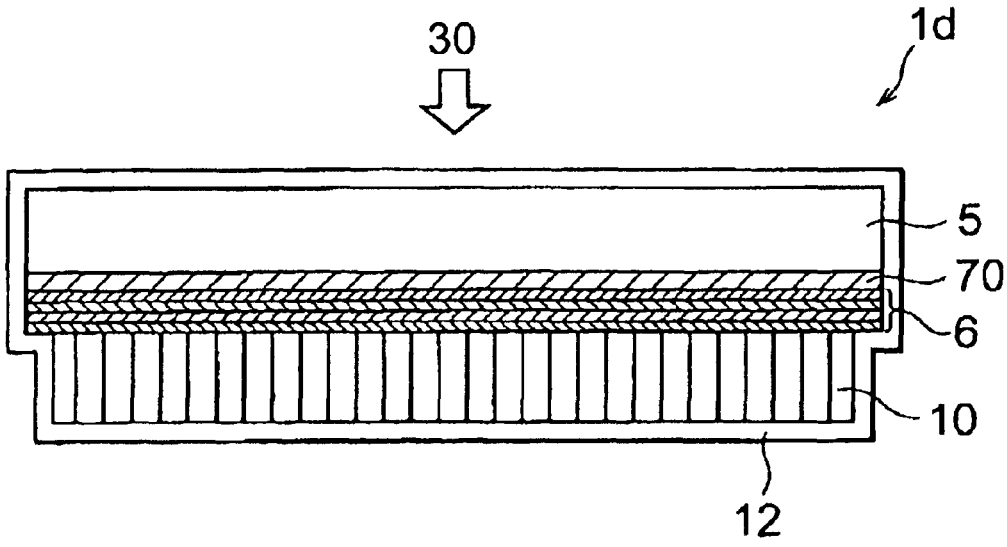
FIG. 9 is a longitudinal sectional view of a third embodiment of a scintillator panel according to the present invention.

FIG. 9 is a longitudinal sectional view of a third embodiment of a scintillator panel according to the present invention. Though this scintillator panel 1d is the same as the scintillator panel 1 shown in FIG. 1 in comprising a Pyrex glass substrate 5, a dielectric multilayer film mirror 6, a scintillator 10, and a polyparaxylylene film 12, it does not have a light-absorbing film 7 at the radiation entry side of the substrate 5 and differs in having an aluminum film 70 as a reflecting film between the substrate 5 and the dielectric multilayer film mirror 6.

Besides aluminum film 70, a metal film, formed of two or more layers, such as chromium (Cr) and silver (Ag) or chromium (Cr) and copper (Cu), etc., may also be used as the reflecting film. Chromium is good in adhesion to silver, copper, or glass and provides the effect of preventing separation from the Pyrex glass substrate 5.

Though as a reflection film, the aluminum film 70 tends to react with scintillator 10 and undergo corrosion, with the present embodiment, since the dielectric multilayer film mirror 6, which is excellent in corrosion resistance, is formed between the aluminum film 70 and the scintillator 10, this problem of corrosion is solved. A polyimide layer maybe disposed between the dielectric multilayer film mirror 6 and the scintillator 10 as a separation preventing layer for preventing the separation of the scintillator 10 from the dielectric multilayer film mirror 6.

Figure 10A:
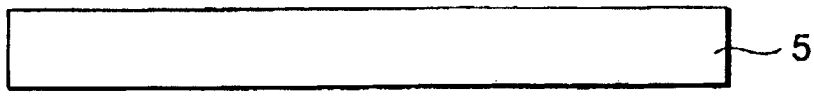
FIG. 10A to FIG. 10F are longitudinal sectional views, illustrating the method for manufacturing this scintillator panel.
Figure 10B:
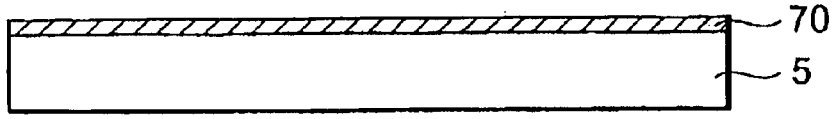
Figure 10C:
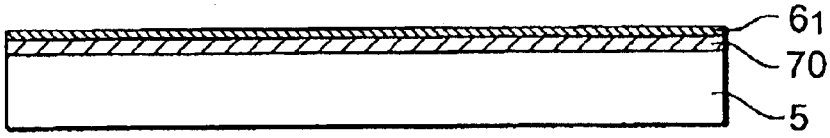
Figure 10D:
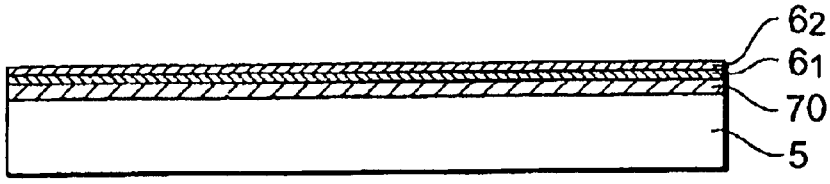
Figure 10E:
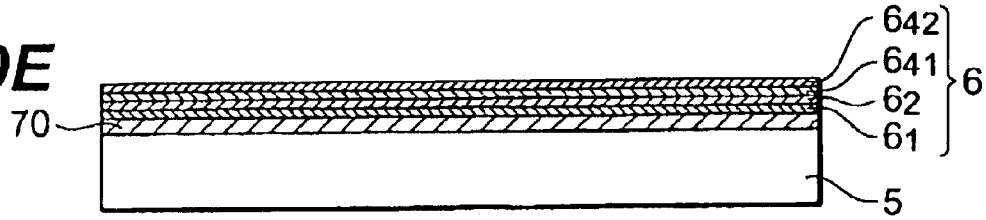
Figure 10F:
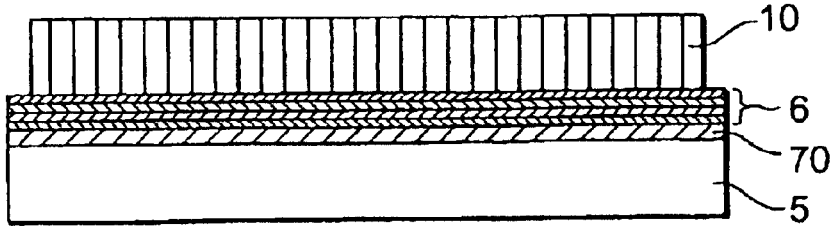

The processes for manufacturing this scintillator panel 1d shall now be described. First, a Pyrex glass substrate 5 of 20 cm square and 0.5 mm thickness is prepared (see FIG. 10A), and 1500 Å of an aluminum film 70 is vapor deposited as a transmitted-light reflecting film onto the Pyrex glass substrate 5 (see FIG. 10B). The subsequent processes of forming a dielectric multilayer film mirror 6 (see FIG. 10C to FIG. 10E), forming a scintillator 10 (see FIG. 10F), and lastly forming a polyparaxylylene film 12 and thereby covering the entirety are the same as those of the corresponding processes shown in FIG. 2A to FIG. 2F and detailed descriptions thereof shall thus be omitted. The scintillator panel 1d shown in FIG. 9 is thus formed.

Since unlike the scintillator panel 1 of the first embodiment, the scintillator panel 1d of the present embodiment is provided with the aluminum film 70, which is a reflecting film, between the dielectric multilayer film mirror 6 and the substrate 5, there is no need to improve the reflectance of the dielectric multilayer film mirror 6 to an extreme and the number of layers thereof may be about four.

Figure 11:
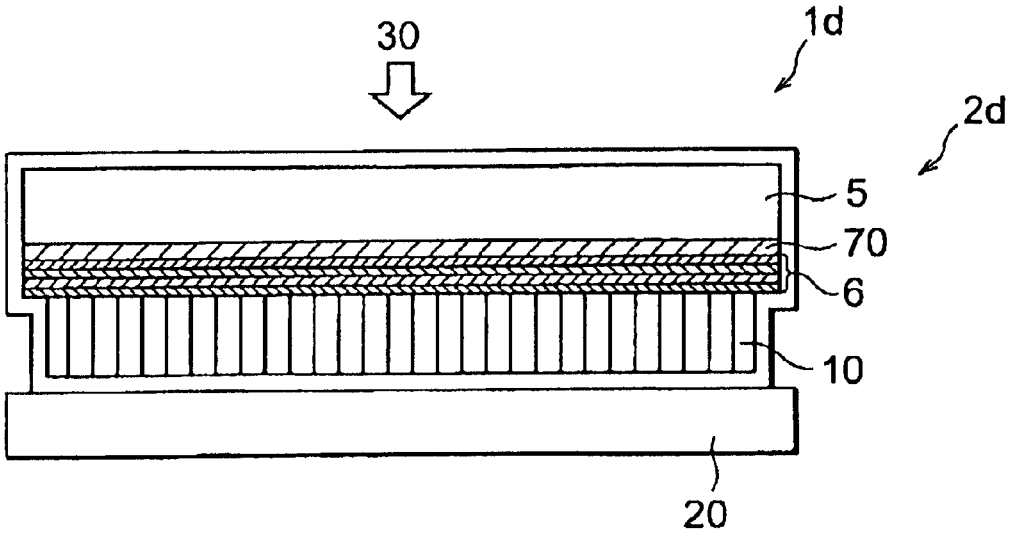
FIG. 11 is a longitudinal sectional view of a fourth embodiment of the radiation image sensor according to the present invention that uses this scintillator panel.

FIG. 11 is a longitudinal sectional view of a fourth embodiment of this invention's radiation image sensor that uses tins scintillator panel 1d. This radiation image sensor 2 is arranged by combining an image pickup device 20 with the scintillator panel 1 shown in FIG. 9 by positioning the image pickup device 20 so as to face the scintillator 10. As with the first to fourth embodiments, a MOS type image sensor having two-dimensionally aligned Si photodiodes may be used as the image pickup device 20.

Figure 12:
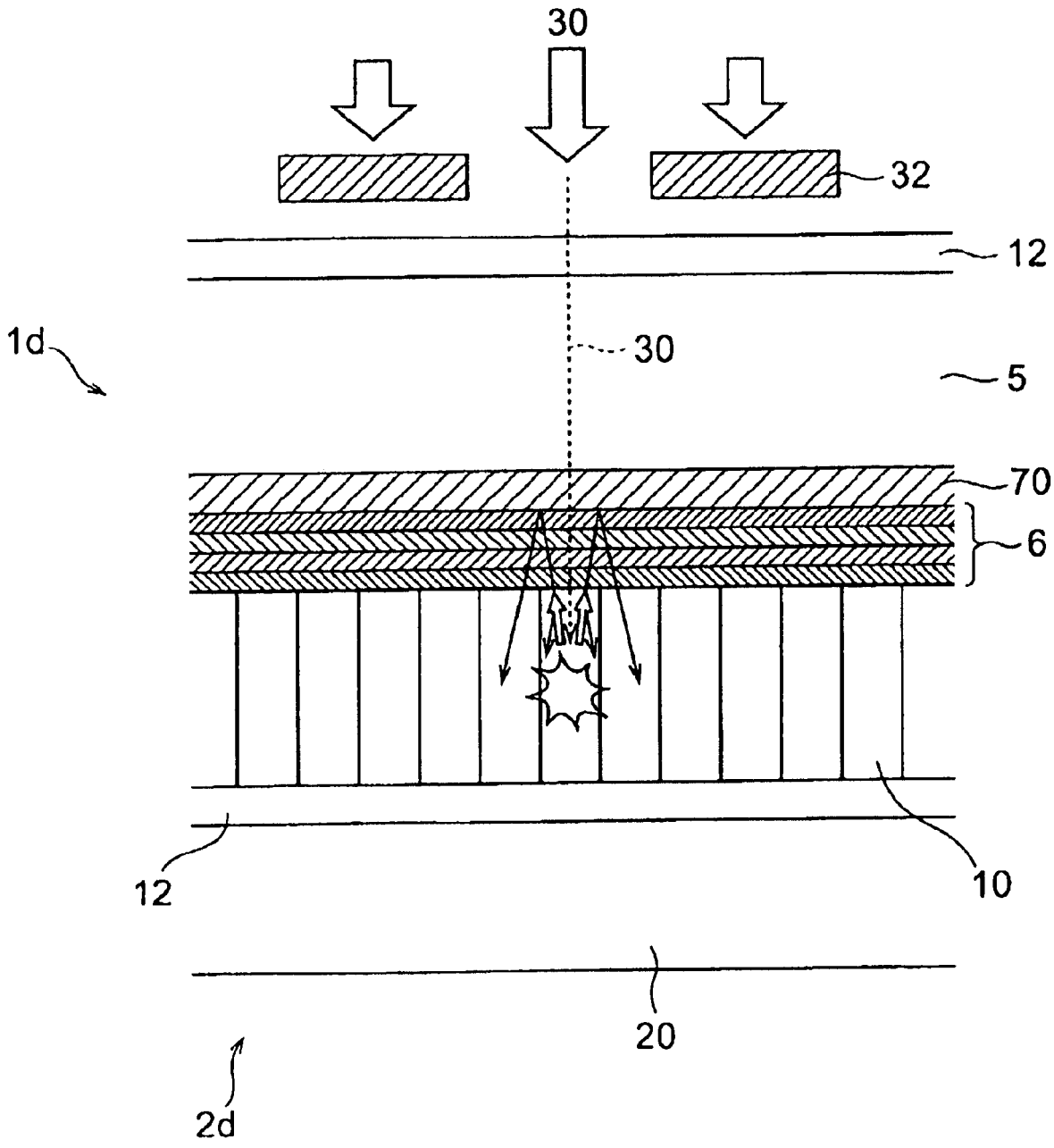
FIG. 12 is an enlarged sectional view, illustrating the operation of this radiation image sensor.

FIG. 12 is an enlarged sectional view for explaining the operation of the radiation image sensor 1d of FIG. 11. Radiation 30, which has not been blocked by or has been transmitted through a subject 32, passes through the polyparaxylylene film 12, Pyrex glass substrate 5, aluminum film 70, and dielectric multilayer film mirror 6 and enters the scintillator 10. The scintillator 10 converts the incident radiation 30 into light and emits this light. Of the light emitted from the scintillator 10, the components that do not proceed toward the image pickup device side but proceed toward the dielectric multilayer film mirror 6 side are reflected by the dielectric multilayer film mirror 6, are thereby returned to the scintillator 10, and in the final stage, proceed toward and are received by the image pickup device 20. The image pickup device 20 converts the received light image information into electrical signals and outputs these signals. The electrical signals that are thus output are sent to and displayed on a monitor, etc., as image signals. Here as mentioned above, since the optical reflectance of the dielectric multilayer film mirror 6 is not 100%, of the light components of the light emitted by the scintillator 10 that proceed toward the dielectric multilayer film mirror 6 side, several % are transmitted through the dielectric multilayer film mirror 6. With the scintillator panel 1d of the present embodiment, since the aluminum film 70 is disposed between the dielectric multilayer film mirror 6 and the Pyrex glass substrate 5, the transmitted light is reflected by this aluminum film 70 and is returned to the dielectric multilayer film mirror 6. Since the entry of light into the Pyrex glass substrate 5 from the scintillator 10 side can thus be prevented definitely and since the entry of light into the scintillator 10 side from the Pyrex glass substrate 5 side can also be prevented definitely, the entry of extraneous light and occurrence of stray light can be restrained definitely and degradation of the resolution and S/N ratio can be restrained as in the first embodiment.

Figure 13:
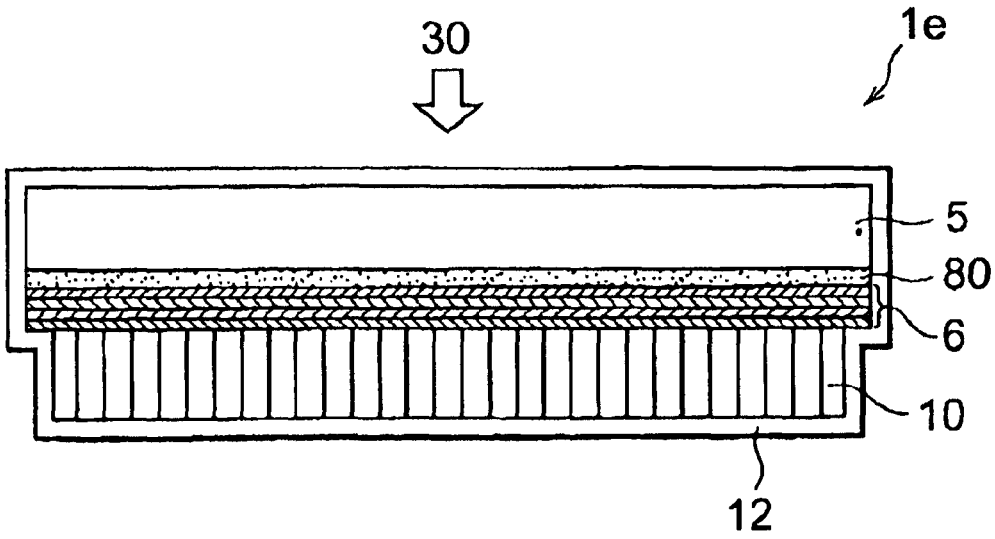
FIG. 13 is a longitudinal sectional view of a fourth embodiment of a scintillator panel according to the present invention.

FIG. 13 is a longitudinal sectional view of a fourth embodiment of a scintillator panel according to the present invention. With this scintillator panel 1e, a carbon-containing polyimide 80 is disposed as a light-absorbing film between the Pyrex glass substrate 5 and the dielectric multilayer film mirror 6. The carbon-containing polyimide 80 absorbs the light that has been emitted from the scintillator 10 and has been transmitted through the dielectric multilayer film mirror 6. This scintillator panel 1e is manufactured by substantially the same steps as those of the scintillator panel 1d and the manufacturing process differs only in that a step of coating and curing a carbon-containing polyimide resin is carried out in place of the aluminum vapor deposition step shown in FIG. 10B.

Figure 14:
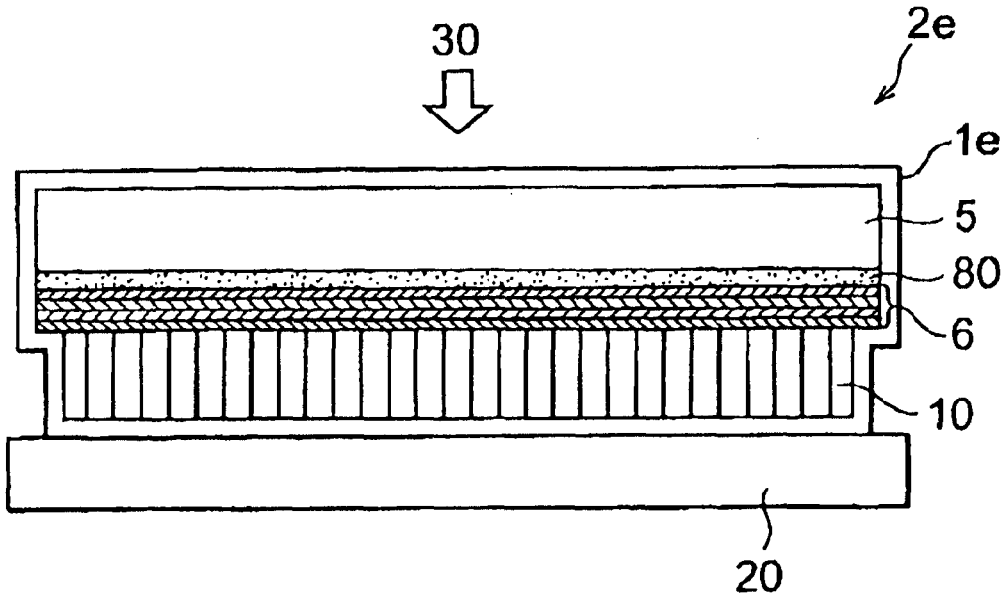
FIG. 14 is a longitudinal sectional view of a fifth embodiment of the image sensor according to the present invention that uses the scintillator panel.
Figure 15:
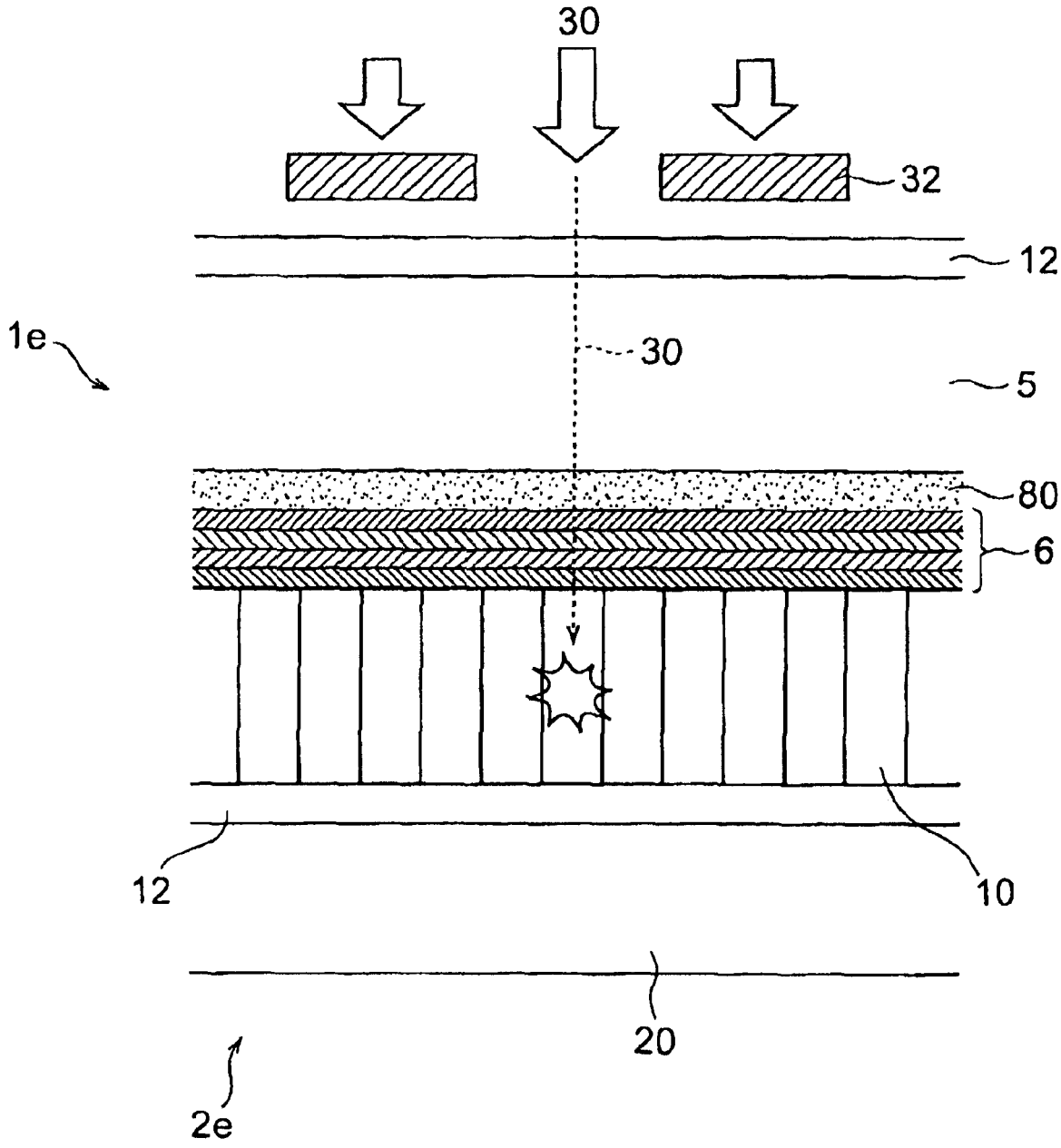
FIG. 15 is an enlarged sectional view, illustrating the operation of this radiation image sensor.
Figure 16:
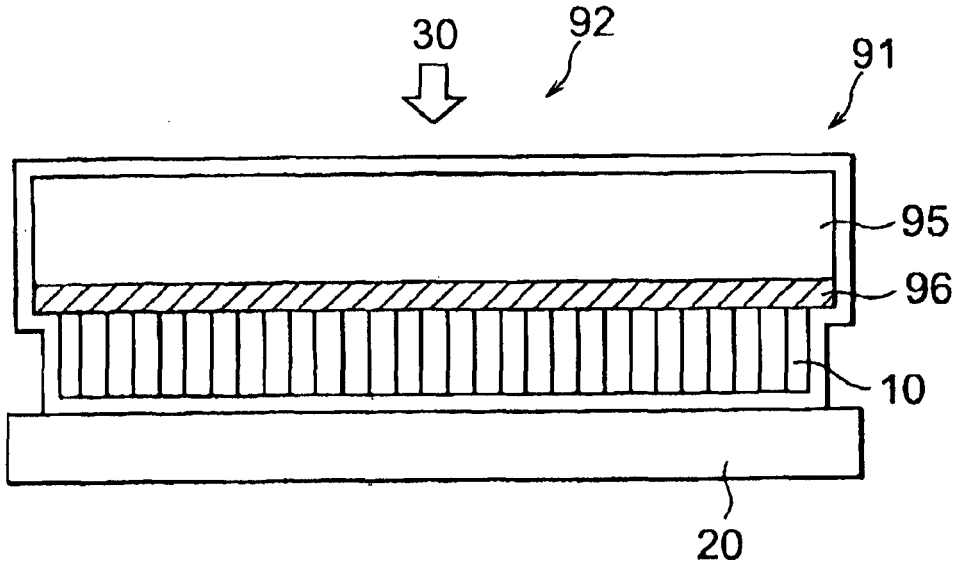
FIG. 16 and FIG. 17 are longitudinal sectional views of a prior-art type radiation image sensor.
Figure 17:
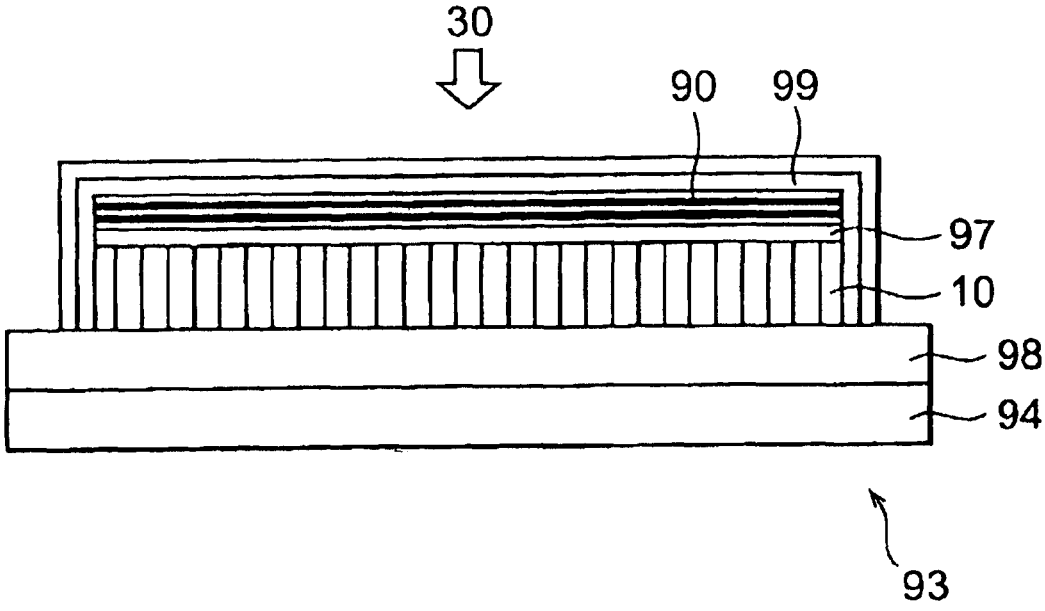

FIG. 14 is a longitudinal sectional view of a radiation image sensor 2e, which is formed by combining the scintillator panel 1e shown in FIG. 13 with an image pickup device 20, and FIG. 15 is an enlarged sectional view, illustrating the operation of this radiation image sensor. Radiation 30, which has not been blocked by or has been transmitted through a subject 32, passes through the polyparaxylylene film 12, Pyrex glass substrate 5, carbon-containing polyimide 80, and dielectric multilayer film mirror 6 and enters the scintillator 10. The scintillator 10 converts the incident radiation 30 into light and emits this light. Though as mentioned above, a part of this light is transmitted through the dielectric multilayer film mirror 6, since the carbon-containing polyimide 80 is disposed as a light-absorbing film between the Pyrex glass substrate 5 and the dielectric multilayer film mirror 6 with the present embodiment, the transmitted light is absorbed by this carbon-containing polyimide 80. Light components, which proceed to the Pyrex glass substrate 5 and are then reflected by the radiation entry surface of the Pyrex glass substrate and thereafter returned to the dielectric multilayer film mirror 6 side, and light components, which pass through the radiation entry surface, undergo repeated reflection inside the housing 25, and re-enter into the radiation image sensor 52, therefore do not occur. The lowering of contrast and other degrading effects on the optical output are thus prevented.

In order to evaluate the contrast ratios of the radiation image sensors 2d and 2e, having the scintillator panels 1d and 1e of the third and fourth embodiments, two samples (referred to as "Examples 3 and 4") of this invention's embodiments and one sample (referred to as "Comparative Example 2") of a prior-art type radiation image sensor were prepared as mutually different arrangements. With all samples, a light-reflecting film that is a dielectric multilayer film is formed on a Pyrex glass substrate, a scintillator formed of CsI is deposited, a polyparaxylylene film is used as a protective film, and a C-MOS is used as the image pickup device. The differences arc that whereas the Comparative Example 2 has a dielectric multilayer film formed directly on the Pyrex substrate, the Example 3 is provided with an aluminum film between the dielectric multilayer film and the substrate and the Example 4 is provided with a carbon-containing polyimide film between the dielectric multilayer film and the substrate.

As a test for measuring the contrast ratio, radiation was irradiated upon placing a lead object of 3 cm diameter and 0.5 mm thickness on the Pyrex glass substrate 5, the signal values acquired by the radiation image sensor for a portion covered by the lead and for a portion exposed to radiation, respectively, were measured, and the ratio of these values was computed. As a result, when the contrast ratio of the Comparative Example 2 is set to 100, the contrast ratios of both of the Examples 3 and 4 were 110, thus confirming that images that are clearer than that obtained by the Comparative Example 2 are acquired by the Examples.

This invention is not limited to the embodiments described above, and modifications, in which the arrangements of the respective embodiments are combined, are obviously included within the scope of this invention. For example, with each of the third and fourth scintillator panel embodiments, a photostimulable phosphor may be used as in the second embodiment. Also, each of the radiation image sensors shown in FIG. 11 and FIG. 14 may be housed inside a housing such as shown in FIG. 8 or FIG. 9. Furthermore, a member for restraining the entry and reflection of light into substrate 5 may be disposed not on just one of the surfaces of the substrate but on both surfaces of the substrate instead.

It is clear from the above description of this invention that this invention can be modified in various ways. Such modifications cannot be regarded as falling outside the gist and scope of this invention and modifications that are obvious to all skilled in the art are included within the scope of the claims.

INDUSTRIAL APPLICABILITY

The scintillator panel and radiation image sensor according to the present invention can be used favorably for chest imaging and other medical uses as well as for non-destructive inspection and other industrial applications.

The invention claimed is:

1. A scintillator panel comprising:

a glass substrate, having heat resistance and transmitting radiation;

a dielectric multilayer film mirror, formed on the radiation incident surface of said glass substrate;

a light absorbing film, formed on the opposite surface to said dielectric multilayer film mirror of said glass substrate;

a scintillator, deposited so as to arrange a plurality of columnar structures on said dielectric multilayer film mirror, such that said dielectric multilayer film mirror is located on a side of said scintillator opposite the radiation incident side of said scintillator, and converting radiation into light and then emitting this light; and a protective film, covering at least said scintillator; wherein said light-absorbing film, absorbs light that has been transmitted through said dielectric multilayer film mirror and said glass substrate which has been emitted by said scintillator; and a separation preventing layer is disposed between said scintillator and said dielectric multilayer film mirror.

2. A scintillator panel manufacturing method comprising the steps of:

preparing a heat-resistant, light-transmitting substrate;

forming a dielectric multilayer film mirror with desired reflection characteristics by laminating multiple dielectric layers of predetermined thickness onto the substrate;

forming by depositing a plurality of columnar structures of a scintillator, which converts radiation into light, on said dielectric multilayer film mirror, wherein the step of forming the dielectric multilayer film mirror is performed prior to the step of forming by depositing the plurality of columnar structures of the scintillator on the dielectric multilayer film mirror, forming a light-reflection preventing member on the surface of the substrate at the side opposite the surface on which said dielectric multilayer film mirror is formed; and priorly or subsequently covering at least said scintillator with a protective film, wherein a separation preventing layer is formed between said scintillator and said dielectric multilayer film mirror.

3. A scintillator panel manufacturing method comprising the steps of:

preparing a heat-resistant, light-transmitting substrate;

forming a light-transmission restraining film, which restrains light transmission, on the substrate;

forming a dielectric multilayer film mirror with desired reflection characteristics by laminating multiple dielectric layers of predetermined thickness onto the light-transmission restraining film;

forming by depositing a plurality of columnar structures of a scintillator, which converts radiation into light, on said dielectric multilayer film mirror, wherein the step of forming the dielectric multilayer film mirror is performed prior to the step of forming by depositing the plurality of columnar structures of the scintillator on said dielectric multilayer film mirror;

covering at least the scintillator with a protective film; and further comprising a step of forming a separation preventing layer between said scintillator and said dielectric multilayer film mirror.

4. A radiation image sensor manufacturing method further comprising the step of disposing an image pickup device so as to face the scintillator of the scintillator panel obtained by the manufacturing method according to claim 2 or 3.

5. The radiation image sensor manufacturing method according to claim 4, further comprising the step of covering said scintillator panel with a housing.

6. A radiation image sensor manufacturing method comprising the steps of:

preparing a heat-resistant, light-transmitting substrate;

forming a dielectric multilayer film mirror with desired reflection characteristics by laminating multiple dielectric layers of predetermined thickness onto the substrate;

forming by depositing a columnar structure of a scintillator, which converts radiation into light, on said dielectric multilayer film mirror, wherein the step of forming the dielectric multilayer film mirror is performed prior to the step of forming by depositing the columnar structure of the scintillator on the dielectric multilayer film mirror;

preparing a scintillator panel by covering at least said scintillator with a protective film;

disposing an image pickup device so as to face the scintillator of said scintillator panel, disposing a light-reflection preventing member, formed of an elastic body, on the surface of said substrate at the side opposite the surface on which the scintillator is formed, and housing said image pickup device and said light-reflection preventing member inside a housing, wherein a separation preventing layer is disposed between said scintillator and said dielectric multilayer film mirror.

*7. A scintillator panel comprising:*

*a heat-resistance substrate at a high temperature;*

*at least one metal reflective film, deposited over the substrate;*

*dielectric layers, having refractive indexes different from each other, deposited over the at least one metal reflective film; and*

*a scintillator, deposited over the dielectric layers, such that said dielectric layers and the at least one metal reflective film are located on a side of said scintillator opposite a radiation incident side of said scintillator,*

*wherein the dielectric layers can be formed at the high temperature.*

*8. A scintillator panel according to claim 7, further comprising:*

*a separation preventing layer disposed between the dielectric layers and the scintillator.*

*9. A scintillator panel according to claim 7, wherein:*

*the dielectric layers comprise an $SiO_2$ layer and a $TiO_2$ layer.*

*10. A scintillator panel according to claim 7, wherein:*

*the dielectric layers comprise an $SiO_2$ layer and a $Ta_2O_5$ layer.*

*11. A scintillator panel according to claim 7, further comprising:*

*a protective film covering the scintillator.*

*12. A scintillator panel according to claim 7, wherein:*

*the at least one metal reflective film is made of aluminum.*

*13. A scintillator panel according to claim 7, wherein:*

*the at least one metal reflective film comprises two or more metal films.*

*14. A scintillator panel according to claim 13, wherein:*

*the metal films include chromium.*

*15. A scintillator panel according to claim 7, wherein the at least one metal reflective film reflects a light from the scintillator that is transmitted through the dielectric layers.*

* * * * *